Patented Mar. 14, 1944

2,344,074

UNITED STATES PATENT OFFICE 2,344,074

PROCESS FOR MANUFACTURING LITMUS DYESTUFFS

Haruyo Asahina, Kawaraki-Mura, Japan; vested in the Alien Property Custodian

No Drawing. Application December 12, 1940, Serial No. 369,909. In Japan January 15, 1940

4 Claims. (Cl. 260—333)

This invention relates to improvements in the manufacture of litmus dyestuff by treating $\beta$-orcin with ammonia in the presence of an alkali.

Litmus dyestuff is generally prepared by fermentating in the open air Roccella tinctoria D. C., a kind of lichen or its analogous vegetable such as Rocella montagnei Bel., R. fuciformis D. C., R. fuccides Wain, and Ochrolechia tartarea Massal, with an ammonium salt added thereto under alkaline conditions.

It requires a long time as about 40 days to produce litmus dyestuff by this known method, and the lichen, the raw material, is found only in very limited parts of the world. These are inevitable drawbacks of the known process.

According to this invention an easily obtainable material, $\beta$-orcin (1,4-dimethylresorcin) or its derivative as diffractaic acid which is easily decomposed and produces $\beta$-orcin is employed as the raw material, and litmus dyestuff or analogous one can be produced in a very short time.

The new process consists of treating the raw material abovementioned with ammonia or an ammonia producing substance in the presence of an alkali, e. g., carbonate of alkali, bicarbonate of alkali, and caustic alkali.

This process is very simple and requires only a few hours for producing litmus dyestuff, and the sensitiveness of the product is not inferior to the best litmus dyestuff now sold in the markets.

A kind of lichen such as Usnea diffracta Wain which is quite different one from the aforementioned Rocella and Ochrolechia, contains a derivative of $\beta$-orcin and is available as the raw material for this invention.

The process is described by way of following examples:

Example 1.—5 parts of $\beta$-orcin, 120 parts of sodium carbonate, 50 parts of ammonia and 50 parts of water, all in weight, are mixed together, and this mixture is heated for a few hours at a temperature between 60° C. to 80° C. when blue litmus dyestuff is produced.

Example 2.—5 parts of $\beta$-orcin, 15 parts of caustic potash, 5 parts of ammonium carbonate and 30 parts of water, in weight, are mixed together, and this mixture is heated for a few hours at a temperature between 50° C. to 80° C.

Example 3.—10 parts of diffractaic acid, 10 parts of caustic soda and 100 parts of water are mixed, and this mixture is heated for a few hours, thereafter 25 parts of 30% ammonia water is added to the mixture to react at a temperature between 50° C. to 80° C.

Example 4.—200 parts of Usnea diffracta Wain, 10 parts of caustic soda and 200 parts of water are mixed, and this mixture is heated for a few hours, thereafter 50 parts of 30% ammonia water is added to the mixture to react at a temperature between 50° C. to 80° C.

In these examples the reaction can be accomplished without heating, but in that case it requires a long time till the product is obtained.

What I claim is:

1. The process of preparing an indicating dyestuff consisting of treating 1,4-dimethylresorcin with ammonia in the presence of a stronger base taken from the group consisting of alkali metal hydroxides and carbonates.

2. The process of preparing an indicating dyestuff consisting of treating 1,4-dimethylresorcin with ammonia in the presence of the carbonate of a stronger alkali metal.

3. The process of preparing an indicating dyestuff consisting of treating 1,4-dimethylresorcin with ammonia in the presence of a stronger alkali metal and carbon dioxide for several hours at temperatures between 50° and 80° C.

4. The process of preparing an indicating dyestuff consisting of treating raw material containing 1,4-dimethylresorcin with an aqueous solution of ammonia in the presence of the carbonate of a stronger alkali metal for several hours at temperatures between 50° and 80° C.

HARUYO ASAHINA.